(12) United States Patent
Rasmussen

(10) Patent No.: US 6,482,371 B1
(45) Date of Patent: Nov. 19, 2002

(54) PROCESS FOR SEPARATION OF HEAVY METALS AND HALOGEN FROM WASTE MATERIAL OR RESIDUE

(75) Inventor: Erik Rasmussen, Gentofte (DK)

(73) Assignee: NKT Research A/S, Brondby (DK)

(*) Notice: Subject to any disclaimer, the term of this patent is extended or adjusted under 35 U.S.C. 154(b) by 0 days.

(21) Appl. No.: 09/555,343

(22) PCT Filed: Nov. 25, 1998

(86) PCT No.: PCT/DK98/00518
§ 371 (c)(1),
(2), (4) Date: Jul. 11, 2000

(87) PCT Pub. No.: WO99/28000
PCT Pub. Date: Jun. 10, 1999

(30) Foreign Application Priority Data

Nov. 28, 1997 (DK) .............................................. 1378/97

(51) Int. Cl.$^7$ .................... C22B 13/00; C22B 15/00; C01F 11/00
(52) U.S. Cl. ......................... 423/1; 423/92; 423/98; 423/178
(58) Field of Search .................... 423/1, 658.5, 98, 423/92, 500, 27, 42, 101, 109, 53, 49, 150.1, 155, 178

(56) References Cited

U.S. PATENT DOCUMENTS

| 5,041,398 A | * | 8/1991 | Kauser et al. ............... 423/101 |
| 5,102,556 A | | 4/1992 | Wong ......................... 210/711 |
| 5,616,160 A | * | 4/1997 | Alexander et al. ...... 423/240 R |
| 5,912,402 A | * | 6/1999 | Drinkard, Jr. et al. ...... 423/109 |

FOREIGN PATENT DOCUMENTS

| EP | 0482335 | 4/1992 |
| EP | 0551155 | 7/1993 |
| WO | 9629118 | 9/1996 |
| WO | 9716230 | 5/1997 |

* cited by examiner

Primary Examiner—Steven Bos
(74) Attorney, Agent, or Firm—Ladas & Parry

(57) ABSTRACT

A process for the separation of heavy metal and halogen from unwanted waste material or residue. Halogen is selectively extracted or washed out from the waste material. Metal is selectively extracted or washed out from the essentially halogen free waste material.

24 Claims, 19 Drawing Sheets

Recycling PVC-cable/(building)waste

Figure 1: Amount extracted lead (mg) as function of pH, liquid-solid ratio and type of coke.

Figure 2: Extracted amount of lead (wt% of intial amount) as function of temperature Figure 3: Overview of recycling structure, experiment 608

Figure 4: Distribution of chloride in products exiting process

*Figure 5:* wt% *chlorine extracted from coke*

Figure 6: Distribution of lead exiting process (wt%)

Figure 7: Precipitated lead in wt% of initial amount

Figure 8: Purity of lead product

Figure 9: Lead and chloride content in coke product

Figure 10: Downstream material balance for experiment 501

Figure 11: Product distribution, experiment 501

Figure 12 : Downstream material balance, experiment 602

Figure 13: Product distribution, experiment 602

Figure 14 : Downstream material balance for experiment 606

Figure 15: Product distribution, experiment 606

Figure 16: Downstream material balance for experiment 608

Figure 17: Product distribution, experiment 608

PROCESS FOR SEPARATION OF HEAVY METALS AND HALOGEN FROM WASTE MATERIAL OR RESIDUE

Heavy metals, such as lead and cadmium, are presented in high amounts in rest-products (coke, ashes, slag) from waste-incineration. In contact with water the heavy metals leak into the surroundings. Heavy metals such as lead and cadmium are extremely toxic and poisonous, and are known to cause human cancer and effect reproductivity. In Denmark, the amount of lead that is collected for deposition and incineration is 1400–3400 tons/year (Miljøstyrelsen, 1997). After incineration around 90% of the heavy metals are found in the ashes, coke and slag. The increased usage of PVC-material has lead to tons of waste, which is usually disposed off by incineration or deposited at controlled waste disposal sites. Upon incineration of PVC material, ashes and coke are formed with a high content of lead and chlorine. PVC alone contribute to $\frac{2}{3}$ of the total amount of chlorine which is incinerated. In fact, the presence of chlorine increases the leakage of heavy metals to the surroundings. Increased amounts of waste for deposition or incineration will lead to an increased pollution caused by the heavy metals and chlorine.

The international patent application WO 9716230 relates to separation of metal chlorine compounds from metallurgical dust. The metallurgical dust is washed to remove the metal chlorine compounds, followed by extracting with nitric acid to dissolve lead, zinc, cadmium, copper, magnesium, calcium and manganese. The pH is raised to 1.8–3.5 to precipitate iron. Finally lead, copper and cadmium is removed. The filtrate is evaporated and decomposed to obtain solid metal oxides and calcium nitrate. Zinc is recovered by further processing.

DE 4217133 relates to a process for removal of chlorine and heavy metals from dust and slag. The process is based on washing the material with an organic acid, filtration of the mixture and separate disposal of filtrate and filter residue. 70% of the lead is separated from the dust and slag.

In another patent application (EP 551155) heavy metals such as lead, zinc, copper and cadmium are extracted and recovered from flue dusts. This is done by treating the flue dusts with an aqueous solution of ammonium and sodium chloride. Lead is in this case dissolved as a chloro complex. The resulting solution is separated from the solid residue. Finally the mixture is further treated to separate zinc.

EP patent no. 482335 describes a process for removal of heavy metals from fly ash particles. This is done by washing with an acidic solution, rinsing and disposing the residue. The acid washings are then treated with for example $Ca(OH)_2$ to give a heavy metal filter cake.

U.S. Pat. No. 5,102,556 proposes a process for removal of heavy metals from iron. based sludges. The sludge is dissolved in hydrochloric acid and is filtered to remove lead chloride.

None of those known processes separate in a simple and economic way the waste into pure materials and/or materials which can be disposed in the nature without problems.

These problems are solved by the present invention.

The present invention proposes a new technology for separation of heavy metals and halogens from coke, ashes, fly ash, slag, metallurgical dust and the like waste products. By exploiting the influence of pH on the metal solubility in water, metals and halogens can selectively be extracted from the waste. The separation sequence include multiple extraction and filtration stages. By treating a waste, for example coke from a PVC recycling process, lead can be separated from the coke into a lead product of a 50–60% lead purity, which can be further concentrated. The chlorine can be separated into a salt with less than 100 ppm lead content. Finally, the coke product has been raffinated for more than 98% of the initial chlorine content, and 90% of the initial lead content.

The process of the invention also propose to separate heavy metals (such as lead) by extracting in an acidic aqueous solution (nitric acid) like some of the known processes as well as use filtration and precipitation as separation techniques. As a new feature, the process of the invention use changes in pH to dissolve, precipitate and separate lead and chlorine from coke.

The process of the invention is a process for separation of heavy metals and halogen from unwanted waste material or residues containing a mixture of these materials, wherein a) the waste material is optionally comminuted, b) carbondioxide optionally is removed from the optionally comminuted material, c) the halogen is selectively extracted or washed out from the optionally comminuted and optionally for carbondioxide removed material providing an essentially halogen free waste material (A) containing heavy metal, and a liquid (B) containing the halogen, d) the metal is selectively extracted or washed out from the waste material (A) from step c) at a low pH providing a waste material essential free from heavy metal and halogen, e) the steps c) and d) are optionally repeated, and f) the extracted metal or metals is optionally precipitated.

The unwanted waste material can for example be a residue as produced by a PVC recycling process as described in PCT/DK96/00117 or from an incineration plant. This residue will have to be milled or in another way comminuted, whereas other waste materials need not be comminuted.

The heavy metal can be metals such lead, copper, zinc, cadmium, chromium, tin, manganese and nickel and mixtures of two or more metals.

The halogen can be chlorine, bromine or fluorine or a mixture of two or all three. The halogen is bound halogen, normally bound as an inorganic compound.

Steps c) and d) can be combined into one step.

Steps c) and d) can also be repeated as b),b),b . . . c),c),c) . . . as many times as wanted using pure water or recycled washing liquids from former steps, and water in the last washing step.

The process of the invention can thus be performed with or without recycling of the filtrates, in order to minimise the consumption of chemicals.

A basic pH in step c) is achieved by using a base such as $Al_2OH_3$, an alkaline or earth alkaline metal hydroxide or a mixture thereof. Specific examples of usable bases are NaOH, $CaOH_2$, KOH, $MgOH2$. $CaOH_2$ is preferred, because it leads to an end product useful as a fertiliser, as thaw salt or industrially useful in another way.

An acidic pH in step d) is achieved by using an acid. The acid can be selected from the group consisting of HCl, HNO3 and acetic acid. HCl is preferred. By using $CaOH_2$ and HCl for treating the coke from a PVC recycling process according to for example PCT/DK 9,600,117 it is possible to convert the waste material totally in reusable materials. The lead can be separated from the coke into a lead product of a 50 to 60% lead purity, which is such a high concentration, that it is economically feasible to recover the lead therefrom. The chlorine is separated as $CaCl_2$ with a lead content of less than 100 ppm, which permits use of this material without polluting nature. Finally, the coke product has been raffinated for more than 98% of the initial chlorine content and 90% of the initial lead content.

Step c) can be conducted at any pH , but pH 7–11 is preferred. Even more preferred is pH 9–10.

Step d) can be conducted at pH 0–4, preferably pH 1–2.

In the present invention is has been shown, that the liquid-solid ratio is important. In both step c) and step d) it is possible to use a ratio of 0.5:1 to 50:1. In step c) is it preferred to use a ratio of 1.5:1 to 3:1 and in step d) a ratio of 3:1 to 5:1.

It is possible to use a temperature of 0 to 200° C. in step c) as well as in step d). Higher temperatures will often give a faster process, but at a higher cost. Step c) is therefore normally performed at room temperature. Step d) is usually performed at 20 to 100° C.

Extracted metal from step d) is preferably precipitated at a high pH, but it is also possible to recover the metal in another way, for example by electrolysis of the solution.

It is possible to use atmospheric pressure or a higher pressure.

The invention is further illustrated referring to the accompanying companying drawing, where FIG. 1 illustrates the extraction of lead as function of different parameters.

EXPERIMENTAL PART

Figure 1:
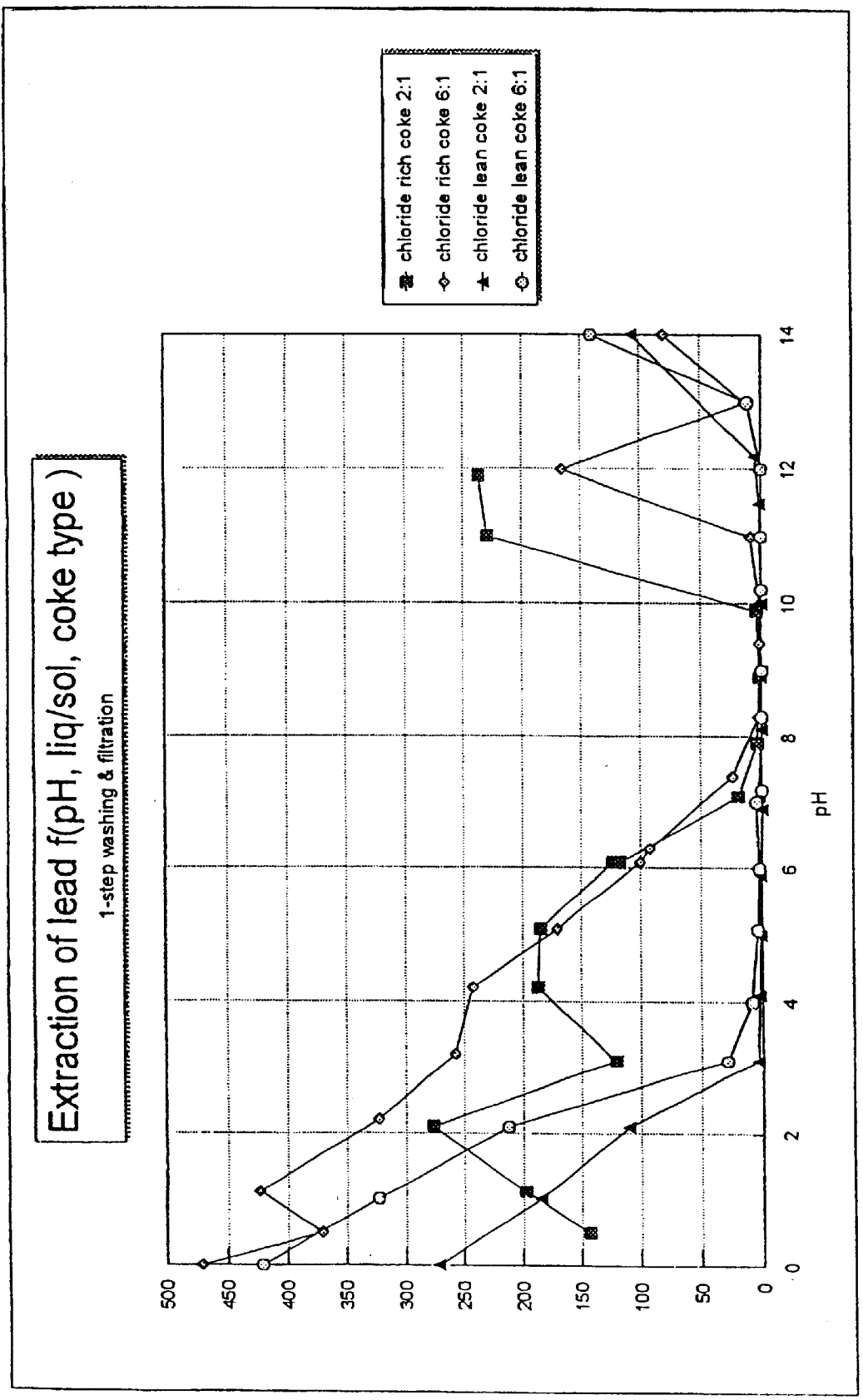

In the following experimental part of the specification reference is made to removal of lead and chlorine from a coke from a PVC recycling process such as for example the process of PCT/DK96/00117. The person skilled in the art will know how to modify the examples to use the invention on other products containing other heavy metals and or other halogens.

The Influence of Different Parameters

In a PVC recycling process (as described in international patent application no. PCT/DK 96/00117), a coke product is formed, which consists of high amounts of chlorine (40 weight %) and approximately 14190 ppm lead. The following results will illustrate how the lead solubility is influenced by parameters such as pH, temperature, liquid-solid ratio, chlorine content and coke surface area (comminution). The influence of these parameters on the lead solubility will be exploited by the new technology for separation of chlorine and lead from coke and ashes.

Separation of Lead from Coke in Aqueous Suspension

In these experiments lead is separated from coke through a extraction-filtration procedure. The starting material is 50 g coke from a PVC recycling process. The coke consists of 20 g chlorine (40 weight-%) and 709.5 mg lead (14190 ppm). Water is added to the coke product in a liquid-solid ratio 2.6 (stage 1) and liquid-solid ratio 1.0 (stage 2–11). Lead is extracted from the coke product by washing and filtration in 11 stages. The results are illustrated in Table 1. According to Table 1, 155.93 mg of lead is removed from the coke after 11 stages. This corresponds to only 22% of the initial amount of lead (709.5 mg). Approximately 94% of the lead which dissolves, is extracted after 3 stages. The pH of the slurry to be filtered range from 5.7 to 7.2. Water alone does not seem to have the extractive power for a complete separation of lead from coke. A chlorine content of more than 1% (9.753 mg/l) leads to an increase in the lead solubility.

TABLE 1

Separation of lead from chlorine rich coke product with water

| Step no: | Liquid-solid ratio | Lead conc. in filtrate (mg/l) | Chlorine concentration in filtrate (mg/l) | pH of slurry | Volume of filtrate (nd) | Mass of extracted lead (mg) |
|---|---|---|---|---|---|---|
| 1 | 2.6 | 1011 | 85120 | 5.7 | 130 | 131.43 |
| 2 | 1.0 | 221 | 25020 | 6.2 | 53 | 11.71 |
| 3 | 1.0 | 58 | 9753 | 6.6 | 55 | 3.19 |
| 4 | 1.0 | 37 | 5763 | 6.6 | 47 | 1.74 |
| 5 | 1.0 | 27 | 3910 | 6.6 | 57 | 1.54 |
| 6 | 1.0 | 22 | 2311 | 6.9 | 49 | 1.08 |
| 7 | 1.0 | 21 | 1212 | 7.1 | 50 | 1.05 |
| 8 | 1.0 | 21 | 1024 | 7.2 | 49 | 1.03 |
| 9 | 1.0 | 21 | 705 | 7.2 | 50 | 1.05 |
| 10 | 1.0 | 21 | 671 | 7.2 | 50 | 1.05 |
| 11 | 1.0 | 20 | 436 | 7.2 | 53 | 1.06 |
| Total | | | | | | 155.93 |

Separation of Lead from Coke at Acidic Conditions in Aqueous Suspension

The starting material is again 50 g coke, with a lead concentration of 14190 ppm, and a chlorine content of 40 weight-%. Results from washing of coke product with 0.1 M nitric acid in aqueous suspension are illustrated in Table 2. According to Table 2, 563.31 mg lead is extracted after 11 stages. This corresponds to 80% of the initial amount of lead (709.5 mg). These results may be compared with Table 1, where only 22% of the total amount of lead was extracted after 11 stages. The low pH, which is created by the nitric acid, has a significant effect on the lead solubility. Approximately 96.6% of the lead which dissolves, is extracted after 3 stages. The pH of the slurry range from 1.4 to 3.8. The solubility of lead is highest at the low pH which is created by the acidic nitric acid. Therefore, it is recommended to keep a low pH for the extraction of lead from coke. It is interesting to note, that in the pH range 2.1–3.2 there is an increase in the lead solubility. This effect is not found for the first case, with aqueous solution, where pH range from 5.7–7.2. One explanation may be, that specific lead salts dissolve in this pH range, leading to a more efficient separation of lead from coke.

TABLE 2

Separation of lead from chlorine rich coke-product with 0.1 M nitric acid

| Stage no: | Liquid-solid ratio | Lead conc. in filtrate (mg/l) | Chlorine conc. in filtrate (mg/l) | pH of slurry | Volume of filtrate (ml) | Extracted amount of lead (mg) |
|---|---|---|---|---|---|---|
| 1 | 2.6 | 2766 | 108350 | 3.8 | 105 | 290.43 |
| 2 | 1.0 | 527 | 32995 | 4.1 | 50 | 26.35 |
| 3 | 1.0 | 94 | 11630 | 4.3 | 51 | 4.79 |
| 4 | 1.0 | 43 | 5519 | 4.1 | 50 | 2.15 |
| 5 | 1.0 | 557 | 2856 | 3.2 | 50 | 27.85 |
| 6 | 1.0 | 1322 | 1762 | 2.7 | 50 | 66.10 |
| 7 | 1.0 | 1160 | 1420 | 2.1 | 51 | 59.16 |
| 8 | 1.0 | 735 | 800 | 1.7 | 50 | 36.75 |
| 9 | 1.0 | 452 | 535 | 1.6 | 50 | 22.60 |
| 10 | 1.0 | 271 | 407 | 1.5 | 50 | 13.55 |
| 11 | 1.0 | 271 | 155 | 1.4 | 50 | 13.55 |
| Total | | | | | | 563.31 |

The Influence of pH and Liquid-solid Ratio on Lead Solubility for Chlorine Rich Coke The influence of pH on the lead solubility is investigated for the pH range 1–14. In addition, the effect of liquid/solid ratio (2:1 and 6:1) on the lead solubility is determined. Further, the effect of the presence of chlorine on the lead solubility is analysed. From Table 3, it can be noted, that a high solubility of lead can be obtained both at basic and acidic conditions. Around 40% of the lead content can be dissolved in 1 stage at pH 2, or 33% at pH 12.

There is a minimum in lead solubility in a pH interval around pH 9–10. The variation in lead solubility with pH can be exploited for the separation of chlorine and lead from coke/ashes/slag.

TABLE 3A

Lead solubiiity as function of pH for chlorine-rich coke (L:S = 2)

| pH | Lead conc. (mg/l) | Removed lead in weight- %, 1 stage (L:S = 2) |
|---|---|---|
| 0.5 | 1426 | 0.20 |
| 1.1 | 1983 | 0.28 |
| 2.1 | 2770 | 0.39 |
| 3.1 | 1210 | 0.17 |
| 4.2 | 1879 | 0.26 |
| 5.1 | 1854 | 0.26 |
| 6.1 | 1234 | 0.17 |
| 6.1 | 1167 | 0.16 |

TABLE 3A-continued

Lead solubiiity as function of pH for chlorine-rich coke (L:S = 2)

| pH | Lead conc. (mg/l) | Removed lead in weight- %, 1 stage (L:S = 2) |
|---|---|---|
| 7.1 | 188 | 0.03 |
| 7.9 | 36 | 0.01 |
| 8.9 | 14 | 0.00 |
| 9.9 | 41 | 0.01 |
| 11.0 | 2285 | 0.32 |
| 11.9 | 2362 | 0.33 |

TABLE 3B

Lead Solubility as function of pH for chlorine-rich coke (L:S = 6)

| pH | Lead conc. (mg/l) | Removed lead in weight- %, 1 stage (L:S = 2) |
|---|---|---|
| 0.0 | 1572 | 0.66 |
| 0.5 | 1236 | 0.52 |
| 1.1 | 1416 | 0.60 |
| 2.2 | 1077 | 0.46 |
| 3.2 | 860 | 0.36 |
| 4.2 | 807 | 0.34 |
| 5.1 | 570 | 0.24 |
| 6.1 | 332 | 0.14 |
| 6.3 | 307 | 0.13 |
| 7.4 | 81 | 0.03 |
| 8.3 | 10 | 0.00 |
| 9.4 | 7 | 0.00 |
| 10.0 | 4 | 0.00 |
| 11.0 | 29 | 0.01 |
| 12.0 | 554 | 0.23 |
| 13.0 | 44 | 0.02 |
| 14.0 | 269 | 0.11 |

From Table 3B, it can be noted that lead can be dissolved both at acidic and at basic conditions. Again, a minimum in lead solubility exist around pH 9–10. Around 60% of the lead content can be dissolved in 1 stage at pH around 2, or 23% at pH around 12. The lead solubility is at basic conditions only ⅓ of the lead solubility at acidic conditions.

It can be noted, that the liquid-solid ratio has a big impact on the lead solubility. If the liquid-solid ratio is increased from 2:1 to 6:1 at pH 1.1, the amount of lead removed increases from 28% to 60%. By exploiting the differences in pH and liquid-solid ratio on the lead solubility, a lead and chlorine free coke product can be obtained.

The Influence of pH and Liquid-solid Ratio on Lead Solubility for Chlorine Free Coke In the following experiments, the influence of pH and liquid-solid ratio on the lead solubility has been investigated for chlorine-free coke. The investigated pH range is 1–14 and the liquid-solid ratios investigated are 6:1 and 2:1. Table 5 illustrates that lead may be dissolved both at acidic and at basic conditions. A wide pH interval exists, in which the lead solubility is at a minimum (pH 7–11). Around 40% of the lead content can be dissolved in 1 stage at pH 0, or 15 % at pH 14.

TABLE 4

Lead solubility as function of pH for chlorine-free coke (L:S = 2)

| pH | Lead conc. (mg/l) | Removed lead in weight- %, 1 step (L:S = 2) |
|---|---|---|
| 0.0 | 6790 | 0.39 |
| 1.0 | 4621 | 0.26 |
| 2.1 | 2738 | 0.16 |
| 3.1 | 94 | 0.01 |
| 4.1 | 57 | 0.00 |
| 5.0 | 26 | 0.00 |
| 5.9 | 28 | 0.00 |
| 6.9 | 14 | 0.00 |
| 7.1 | 65 | 0.00 |
| 8.1 | 19 | 0.00 |
| 9.0 | 12 | 0.00 |
| 10.0 | 10 | 0.00 |
| 11.5 | 41 | 0.00 |
| 12.2 | 131 | 0.01 |
| 14.0 | 2651 | 0.15 |

TABLE 5

Lead solubility as function of pH for chlorine free coke (L: S = 6)

| pH | Lead conc. (mg/l) | Removed lead in weight %, 1 step, L: S = 6 |
|---|---|---|
| 0.0 | 3519 | 0.60 |
| 1.0 | 2696 | 0.46 |
| 2.1 | 1772 | 0.30 |
| 3.1 | 240 | 0.04 |
| 4.0 | 75 | 0.01 |
| 5.1 | 32 | 0.01 |
| 6.0 | 27 | 0.00 |
| 7.0 | 39 | 0.01 |
| 7.2 | 8 | 0.00 |
| 8.3 | 5 | 0.00 |
| 9.0 | 4 | 0.00 |
| 10.2 | 3 | 0.00 |
| 11.0 | 3 | 0.00 |
| 12.0 | 6 | 0.00 |
| 13.0 | 96 | 0.02 |
| 14.0 | 1174 | 0.20 |

From Table 5 it can again be noted, that lead is soluble both at acidic and at basic conditions. The lead solubility at basic conditions is ⅓ of the lead solubility at acidic conditions. The wide pH interval which signifies the minimum in lead solubility range, from pH 7 to pH 12. Approximately 60% of the lead content can be dissolved in 1 stage around pH 0, or 20% around pH 14. Increasing the liquid-solid ratio by a factor 3, leads to an increase in the dissolved amount of lead from 16 weight % (2:1) to 30 weight % (6:1).

In FIG. 1 the amount of extracted lead, is illustrated as function of pH, liquid-solid ratio and type of coke (chlorine rich/chlorine free coke). It can be noted, that the amount of extracted lead is highest at a low pH (0–2), approaches a minimum, and increases again at pH 10–12. The lead content can therefore be dissolved at both acidic and basic conditions, but the most efficient extraction is obtained at acidic conditions. Compared with the chlorine free coke, the amount of extracted lead is higher for chlorine rich coke. For chlorine-free coke the amount of extracted lead is at a minimum in a wide pH range (pH 4–12). For chlorine rich coke, the amount of extracted lead is at a minimum in a smaller pH range (pH 8–10). By exploiting the differences in pH and liquid-solid ratio on the lead extraction, a lead and chlorine free coke product can be obtained.

Based on the experimental data one can easily see the differences in the amount of extracted lead with pH and choose the optimal parameters for the process of the invention. This can be exploited to selectively separate both lead and chlorine from coke.

Similar experiments can be performed to determine the optimal parameters for other heavy metals and/or other halogens.

The Influence of Temperature on Lead Solubility

Figure 2:
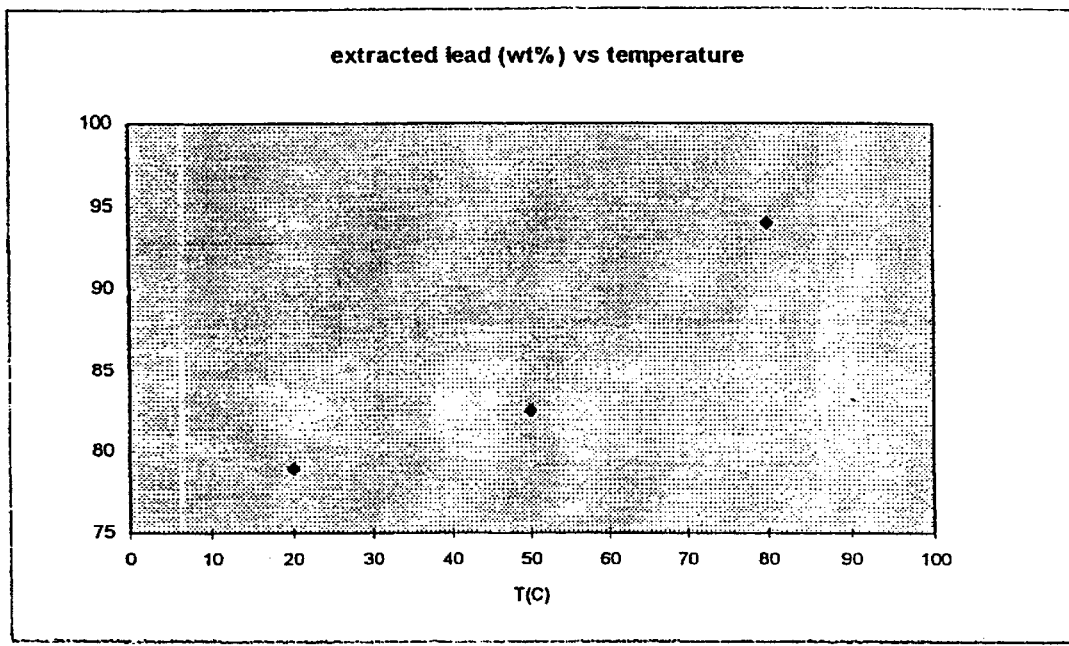
FIG. 2 illustrates the effect of the temperature on lead solubility.

The effect of temperature on the lead solubility has been investigated for 20, 50 and 80° C., and is illustrated in FIG. 2. An increase in temperature from 20° C. to 80° C. leads to a 15 % increase in the amount of extracted lead.

GENERAL METHOD DESCRIPTION

Figure 3:
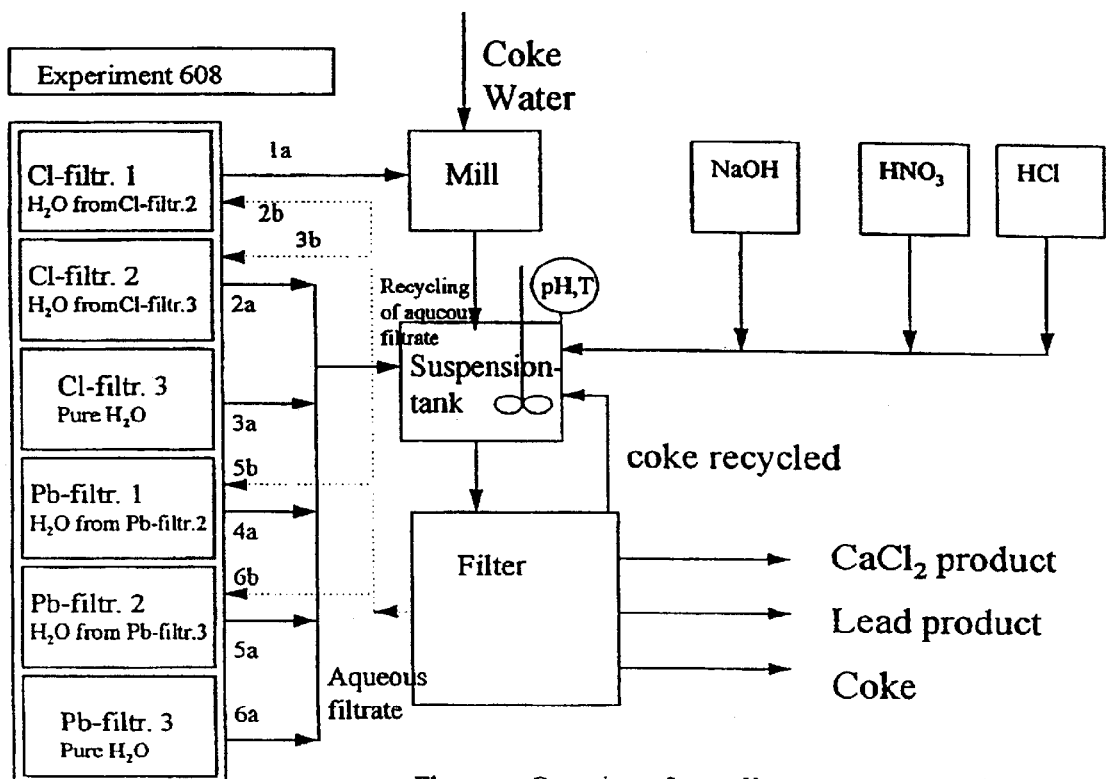
FIG. 3 is a flowsheet of a preferred process of the invention.

On the drawing one example of a possible flowsheet for the separation of chlorine and lead from coke is illustrated in FIG. 3. The flowsheet consists of a mill for comminution of coke, a suspension tank for mixing coke with aqueous solutions (acidic or basic), a slurry pump and filtration equipment. The suspension tank includes equipment for stirring and measurements of pH and temperature. In FIG. 3, steps of the extraction-filtration procedure is illustrated. In order to re-use as much of the chemicals (sodium hydroxide, nitric acid) and water as possible, wash water is recycled within the chlorine and lead separations. It should be noted that parameters such as liquid-solid ratio, temperature, comminution time, pH, type of acid/base and chlorine content in coke affect the lead recovery.

Step 1: Comminution

Chlorine- and lead rich coke (or ashes, slag) is comminuted to a suitable size in 5–10 minutes. This is done to decrease the particle size of the coke, which leads to an efficient extraction of the chlorine and lead from the coke.

Step 2: Separation of Chlorine From Coke

Water is added to the coke, resulting in a suitable liquid-solid ratio. To optional removal of carbon dioxide from the solution, pH is set to <4, using nitric acid or hydrochloric acid. Thereafter, pH is raised to 9.5 with 6M sodium hydroxide during stirring for 30 minutes. At this pH the lead is insoluble. The chlorine can be removed from the coke by filtration in 3 stages.

Step 3: Separation of Lead From Coke

The chlorine free, lead rich coke is charged to a suspension of water in a suitable liquid-solid ratio. pH is lowered to around 1.0 during stirring for 30 minutes with 0.1 M nitric acid. At this pH, lead is dissolved into the aqueous suspension. Lead can be separated from the coke using filtration in 3 stages.

Step 4: Purification of Lead

To the filtrate from step 3 base is added (sodium hydroxide), and pH is raised to approximately 9.5. The lead in the filtrate precipitates as solid lead oxide. The lead oxide is filtered off from the solution. Finally, the lead product may be dried in an oven.

Step 5: Purification of Chlorine Rich Salt

The chlorine rich solution is concentrated by drying. A chlorine rich salt is formed, which in this example is $CaCl_2$.

Step 6: Purification of Coke

In steps 1–3, the coke is converted to a fine particle product, that has been purified from lead and chlorine. The chlorine and lead-free coke may finally be dried to remove excess moisture.

Equipment

Slurry pump, suspension tank, filtration equipment, stirrer, mill, pH measurer, temperature measurer.

DETAILED METHOD DESCRIPTION

The first time the separation of lead and chlorine takes place, pure water is employed in all chlorine and lead filtration steps (see Table 7). The filtrates are collected and filtrates from the second and third filtration are recycled to be re-used in future filtration steps (se table 8). The steps described in the following are based on that the water from the previous separation is reused.

Separation of Lead and Chlorine from Coke with Recycling of Process Water

Step 1: Comminution

Chlorine- and lead rich coke (or ashes, slag) is disintegrated to a suitable size in 5–10 minutes.

Step 2: Separation of Chlorine from Coke

Chlorine Filtration 1

Water is taken from chlorine filtration no.2 (1a), and is added to the mill. Chlorine and lead rich coke is mixed with the water to a suitable liquid-solid ratio (minimum 2:1), and is blended for 10 minutes. The mixture is added to the suspension tank, and the pH is adjusted to 3–4, to remove $CO_2$ gas from the system. This $CO_2$ removal may optionally be performed at any of the chlorine filtration stages. The pH is then raised to 9.5 with sodium hydroxide. The mixture is stirred for 30 minutes. The suspension is filtered. The filtrate (1b) is removed from the system as $CaCl_2$ suspension product, and the coke (1c) obtained after filtration is recycled to the suspension tank.

Chlorine Filtration 2

In the second chlorine filtration, water from the third chlorine filtration (2a) is added to the suspension tank with the coke (1c) in a suitable liquid-solid ratio. pH is adjusted to 9.5, and the mixture is stirred for 30 minutes. The solution is filtered, and the filtrate (2b) is recycled to the chlorine filtration no. 1. The coke (2c) is after filtration recycled to the suspension tank.

Chlorine Filtration 3

In the third chlorine filtration, pure water (3a) is added to the suspension tank together with the coke (2c) in a suitable liquid-solid ratio. pH is adjusted to 9.5, and the mixture is stirred for 30 minutes. The solution is filtered, and the filtrate (3b) is recycled to the chlorine filtration no. 2. The chlorine lean coke (3c) is recycled to the suspension tank for further purification from lead.

Step 3: Separation of Lead from Coke

Lead Filtration 1

Water is taken from lead filtration no. 2 (4a). The water is mixed with the coke (3c) in the suspension tank in a suitable liquid-solid ratio. pH is adjusted to 1.0 with nitric acid to dissolve lead. The mixture is stirred for 30 minutes at a suitable temperature. The solution is filtered. The filtrate is the lead product (4b) which is removed from the system. The coke (4c) is recycled to the suspension tank.

Lead Filtration 2

Water is taken from lead filtration no. 3 (5a) and is mixed with the coke (4c) in the suspension tank in a suitable liquid-solid ratio. pH is adjusted to 1.0, and the mixture is stirred for 30 minutes at a suitable temperature. The solution is filtered, and the filtrate (5b) is recycled to the lead filtration no. 1. The coke (5c) is recycled to the suspension tank.

Lead Filtration 3

Pure water (6a) is added to the suspension tank, and is mixed with the coke (5c) in a suitable liquid-solid ratio. pH is adjusted to 1.0, and the mixture is stirred for 30 minutes at a suitable temperature. The solution is filtered, and the filtrate (6b) is recycled to the lead filtration no.2. The coke product (6c) is now separated from lead and chlorine.

TABLE 7

Initial steps in separation scheme

| Step | In | Filtrate | Coke |
|---|---|---|---|
| Chlorine filtration 1 | 1a | 1b | 1c |
| | Pure water | $CaCl_2$ product | Recycled |
| Chlorine filtration 2 | 1a | 2b | 2c |
| | Pure water | to Cl. filtration 1 | Recycled |
| Chlorine filtration 3 | 3a | 3b | 3c |
| | Pure water | to Cl. filtration 2 | Recycled |
| Lead filtration 1 | 4a | 4b | 4c |
| | Pure water | Lead product | Recycled |
| Lead filtration 2 | 5a | 5b | 5c |
| | Pure water | to lead filtration 1 | Recycled |
| Lead filtration 3 | 6a | 6b | 6c |
| | Pure water | to lead filtration 2 | Coke product |

TABLE 8

Steps in counter current separation scheme

| Step | In | Filtrate | Coke |
|---|---|---|---|
| Chlorine filtration 1 | 1a | 1b | 1c |
| | Water from Cl filtr.2 | $CaCl_2$ product | Recycled |
| Chlorine filtration 2 | 2a | 2b | 2c |
| | Water front Cl filtr.3 | to Cl. filtration 1 | Recycled |
| Chlorine filtration 3 | 3a | 3b | 3c |
| | Pure water | to Cl. filtration 2 | Recycled |
| Lead filtration 1 | 4a | 4b | 4c |
| | Water from Pb filtr.2 | Lead product | Recycled |
| Lead filtration 2 | 5a | 5b | 5c |
| | Water from Pb filtr.3 | to lead filtration 1 | Recycled |
| Lead filtration 3 | 6a | 6b | 6c |
| | Pure water | to lead filtration 2 | Coke product |

Steps 4–6 are performed as described in the foregoing

Sequential Separation of Lead and Chlorine from Coke without Recycling of Process Water If desired, the wash-water needs not to be recycled within the chlorine and lead separation steps. Therefore, pure water can be used in every step. This will increase the use of chemicals, water and waste streams. The separation will occur according to Table 7, but with no recycling of filtrates between the filtration steps.

General Results From Applying the Method of the Invention

Results

1) A lead concentrate with 50–60 weight % lead content, which can further raffinated
2) A chlorine product (salt) with less than 100 ppm lead.
3) Coke with less than 0.4 weight % lead, 0.5 weight % chlorine

Results From Separation of Chlorine From Coke

Figure 4:
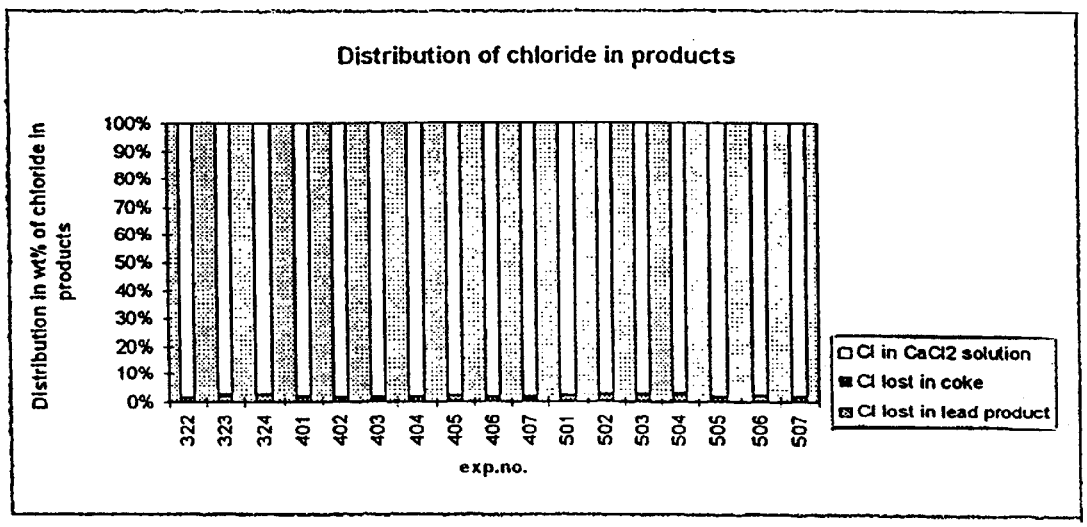
FIG. 4 illustrates the distribution of chlorine in products exiting the process.

FIG. 4 illustrates that 1–2 weight % of the initial chlorine amount in the coke is lost in the lead product, and a very small fraction is lost in the coke (less than 0.5 weight % of the initial chlorine amount).

Figure 5:
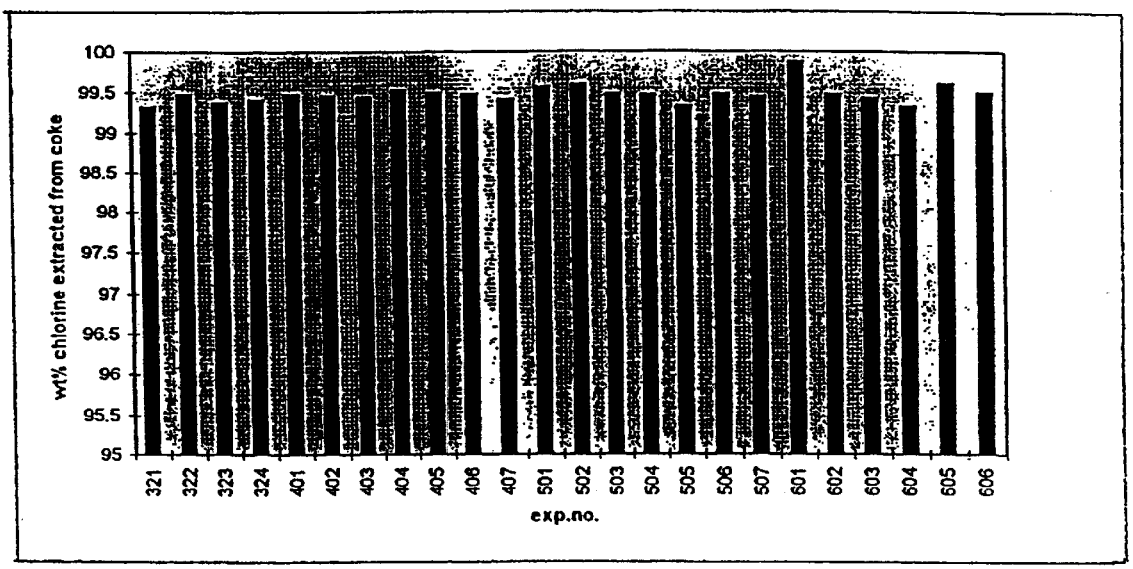
FIG. 5 illustrates the amount of extracted chlorine from the coke.

FIG. 5 illustrates that more than 98 weight % of chlorine is extracted from the coke into the $CaCl_2$ product.

Results From Separation of Lead From coke

Figure 6:
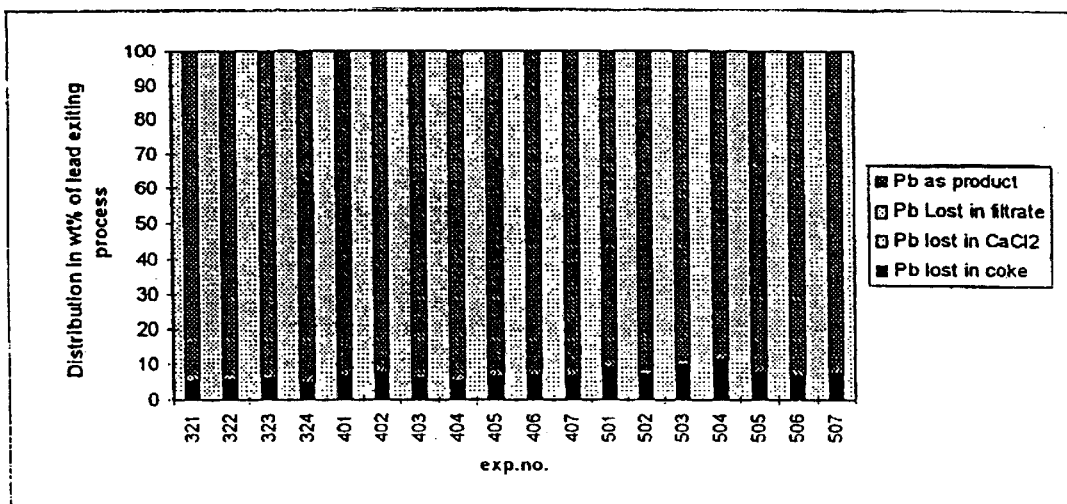
FIG. 6 illustrates the distribution of lead exiting the process.

Only 5–8 weight % of the total amount of lead which exit the process is allocated to the coke (see FIG. 6). This corresponds to only 0.4 weight % lead in the coke. A very small fraction of the lead is lost in the lead filtrate and in the $CaCl_2$ product. 95–98 weight % of the lead which exits the process is allocated to the lead product.

Figure 7:
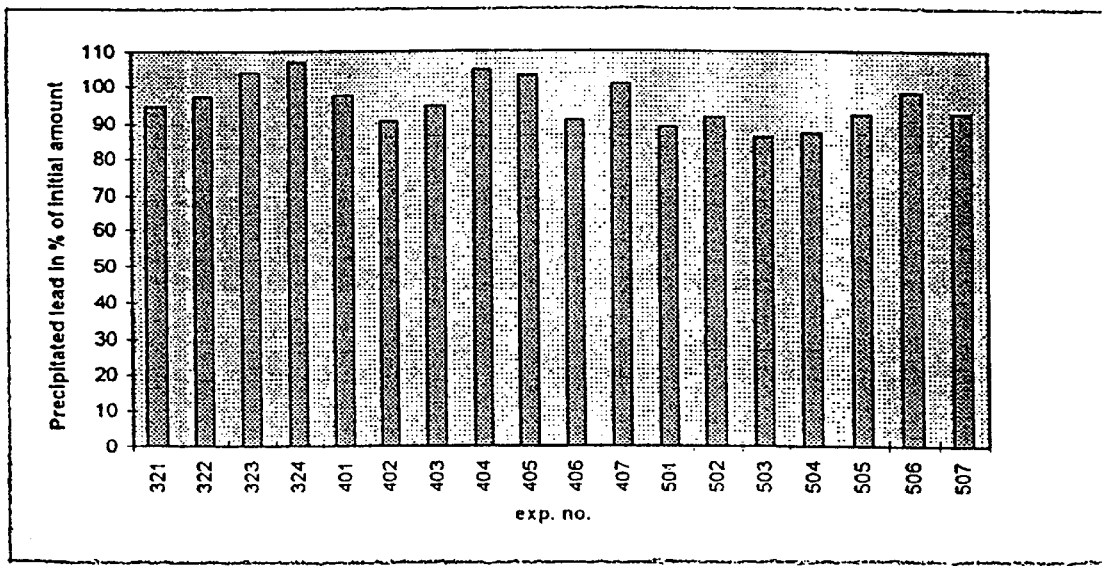
FIG. 7 illustrates precipitated lead in weight % of the initial amount.
Figure 8:
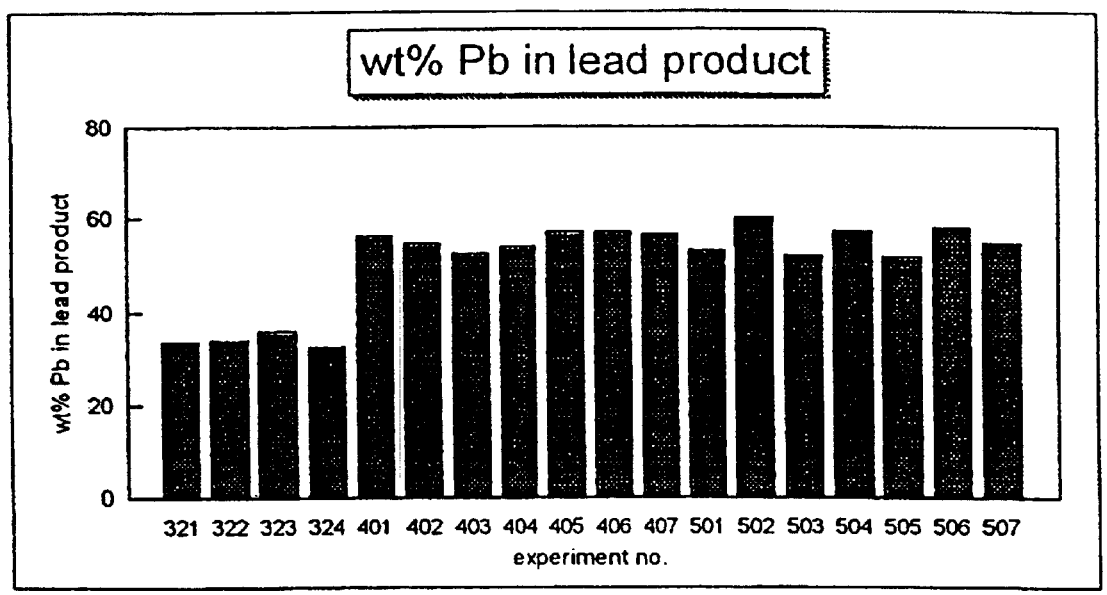
FIG. 8 illustrates the purity of the lead product.

In FIG. 7, the amount of precipitated lead is illustrated as weight % of the initial amount in the coke. Approximately 95% of the initial amount of lead in coke is precipitated into a lead product. This indicates a high recovery of lead.

The purity of the lead product is, according to FIG. 8, 50–60%.

Figure 9:
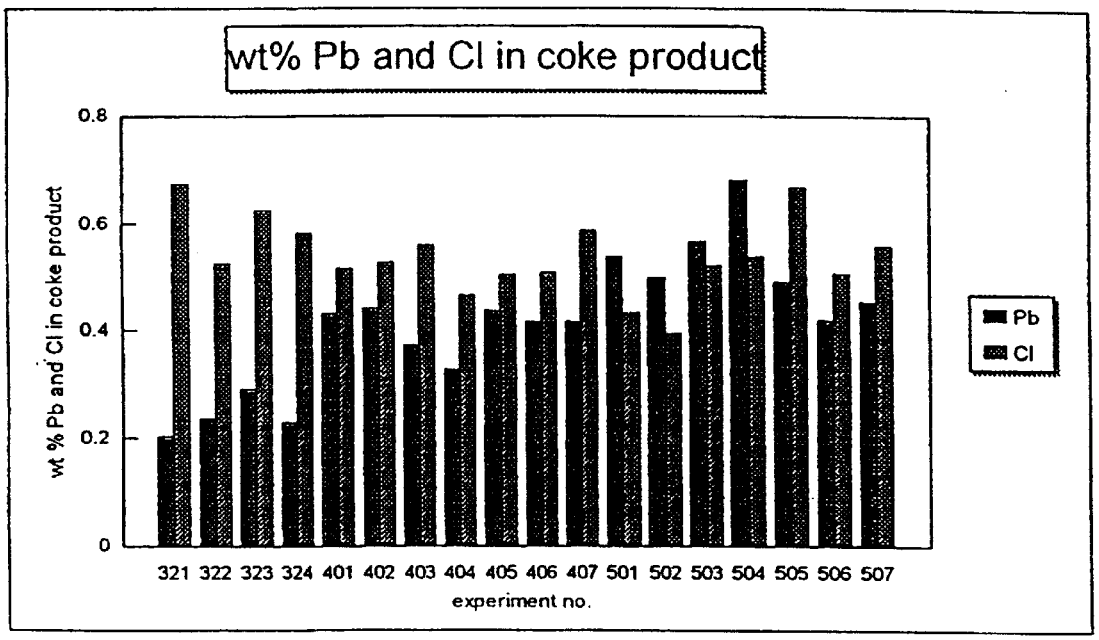
FIG. 9 illustrates the amount of lead and chlorine in the treated coke product.
Figure 10:
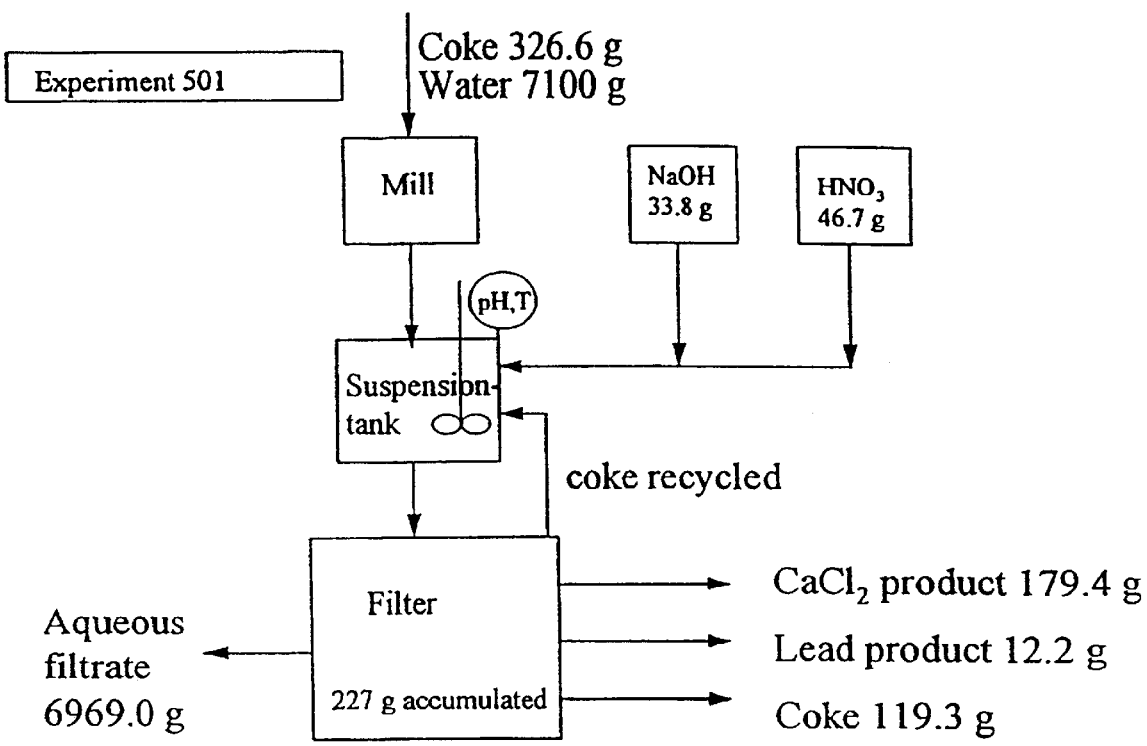
FIG. 10 is a flowsheet of the material balance for (experiment 501) example 1.
Figure 11:
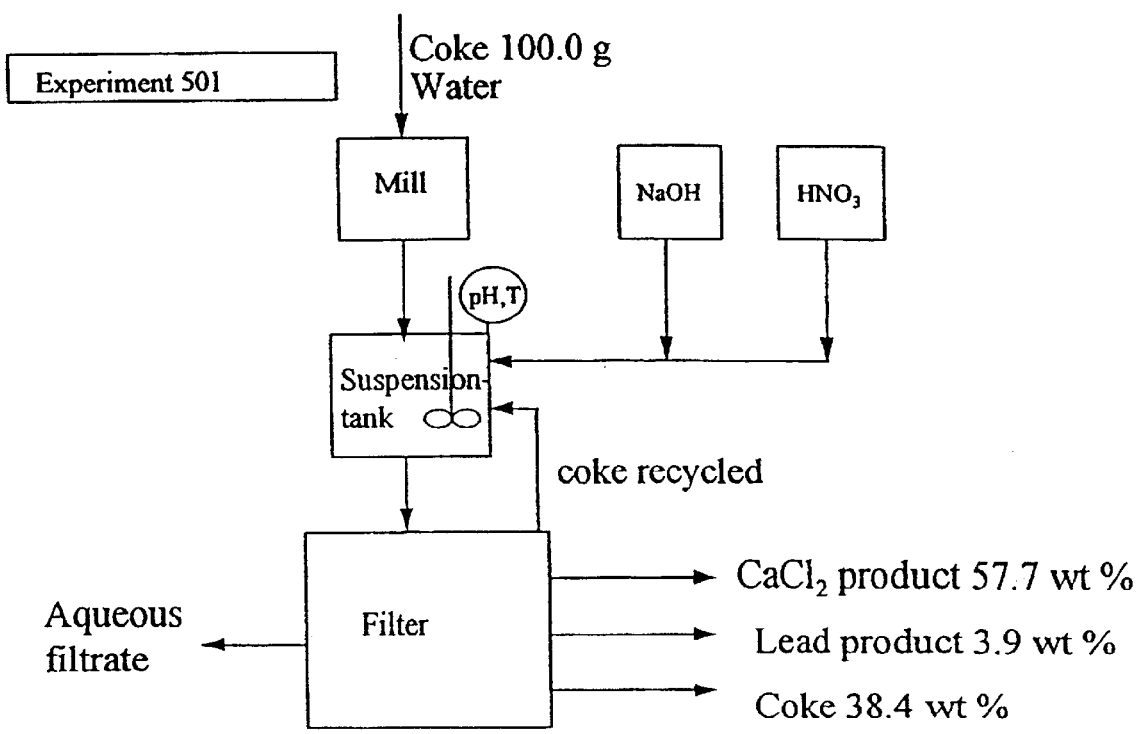
FIG. 11 is a flowsheet of the product distribution in (experiment 501) example 1.
Figure 12:
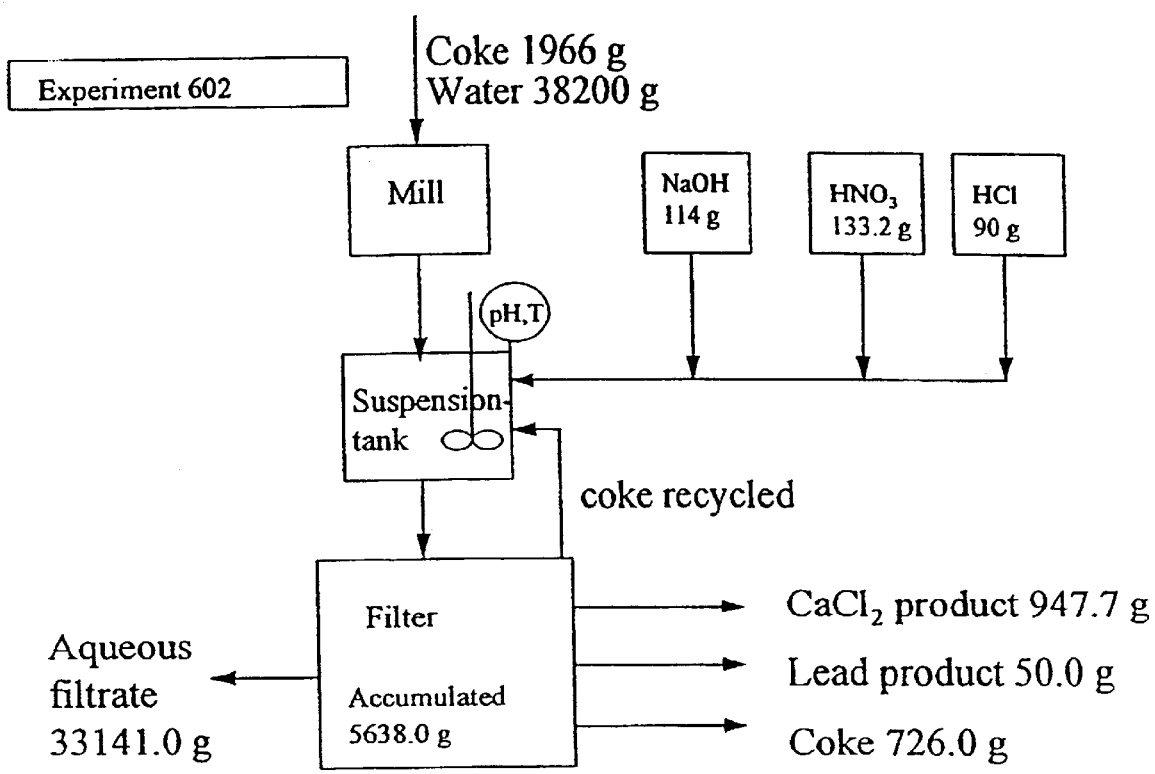
FIG. 12 is a flowsheet of the material balance for (experiment 602) example 2.
Figure 13:
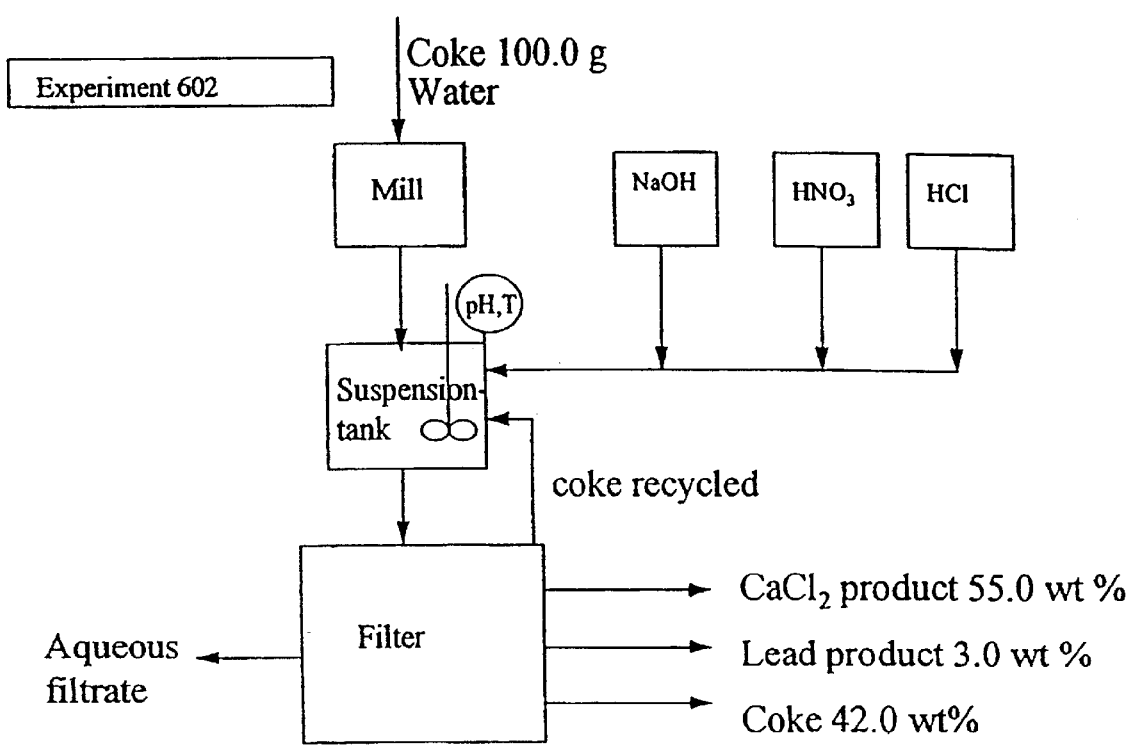
FIG. 13 is a flowsheet of the product distribution in (experiment 602) example 2.
Figure 14:
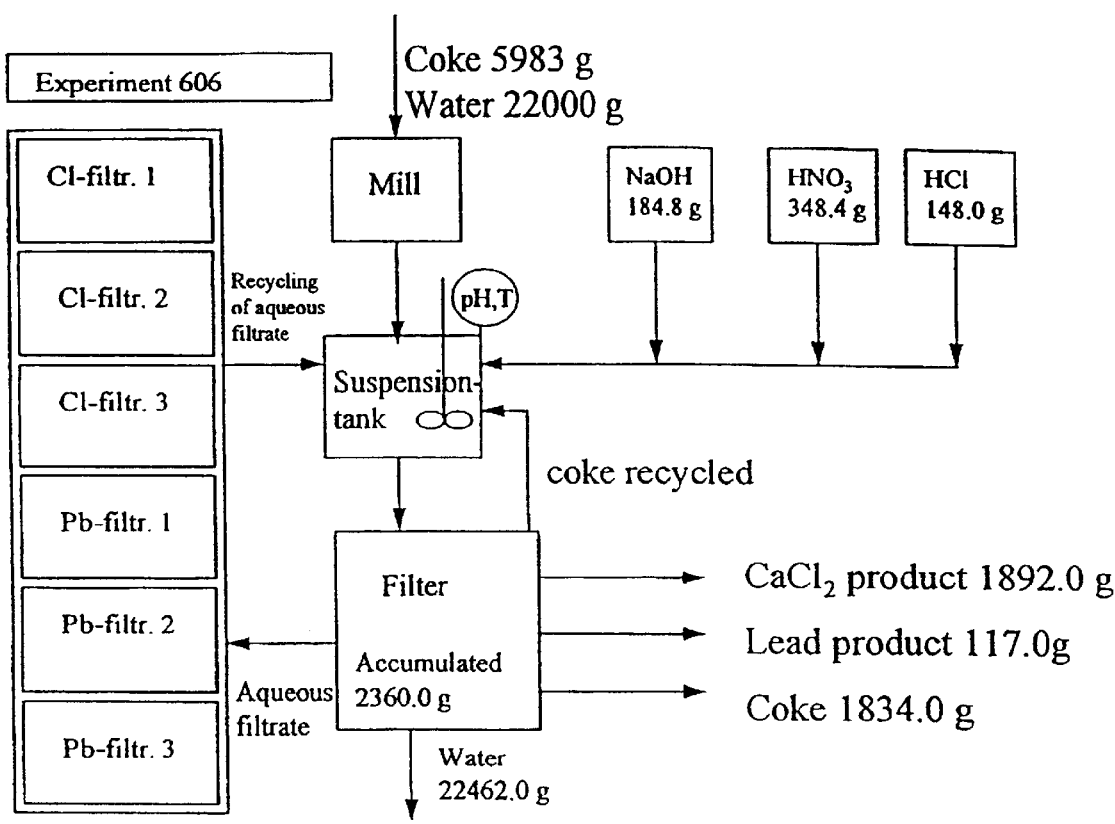
FIG. 14 is a flowsheet of the material balance for (experiment 606) example 3.
Figure 15:
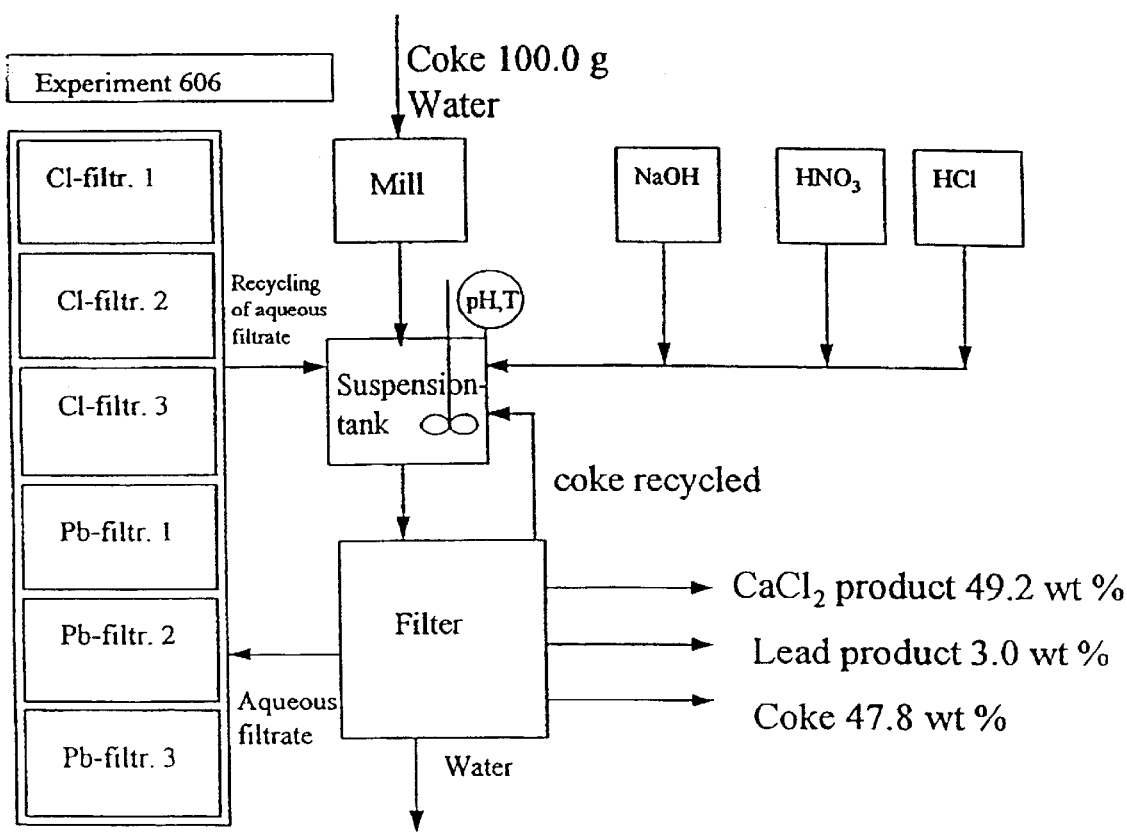
FIG. 15 is a flowsheet of the product distribution in (experiment 606) example 3.
Figure 16:
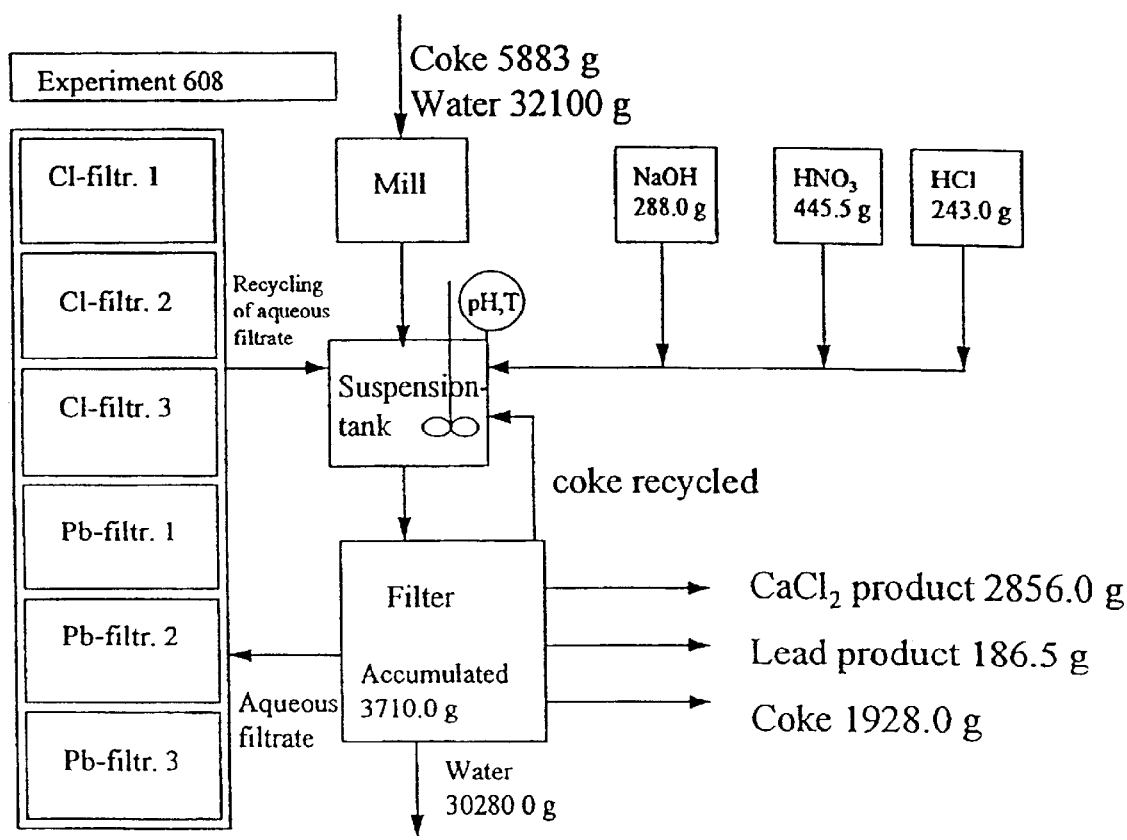
FIG. 16 is a flowsheet of the material balance for (experiment 608) example 4.
Figure 17:
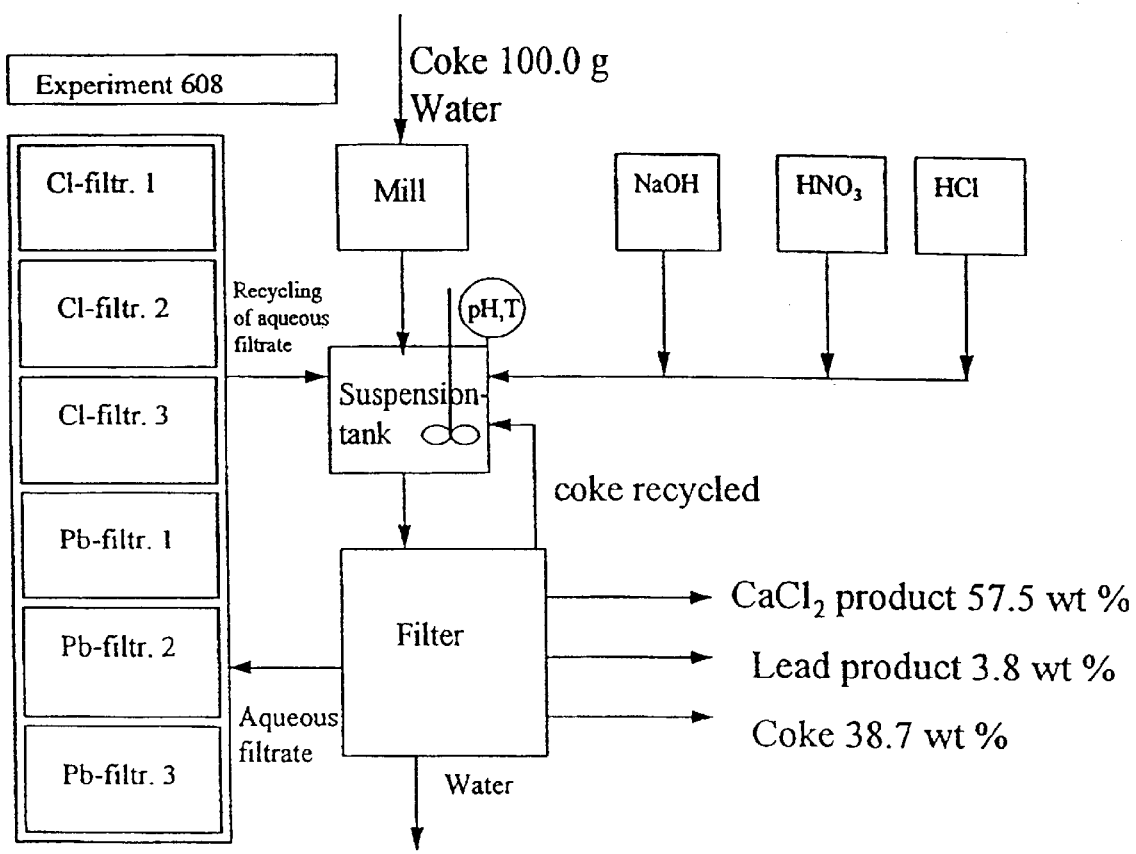
FIG. 17 is a flowsheet of the product distribution in (experiment 608) example 4.
Figure 18:
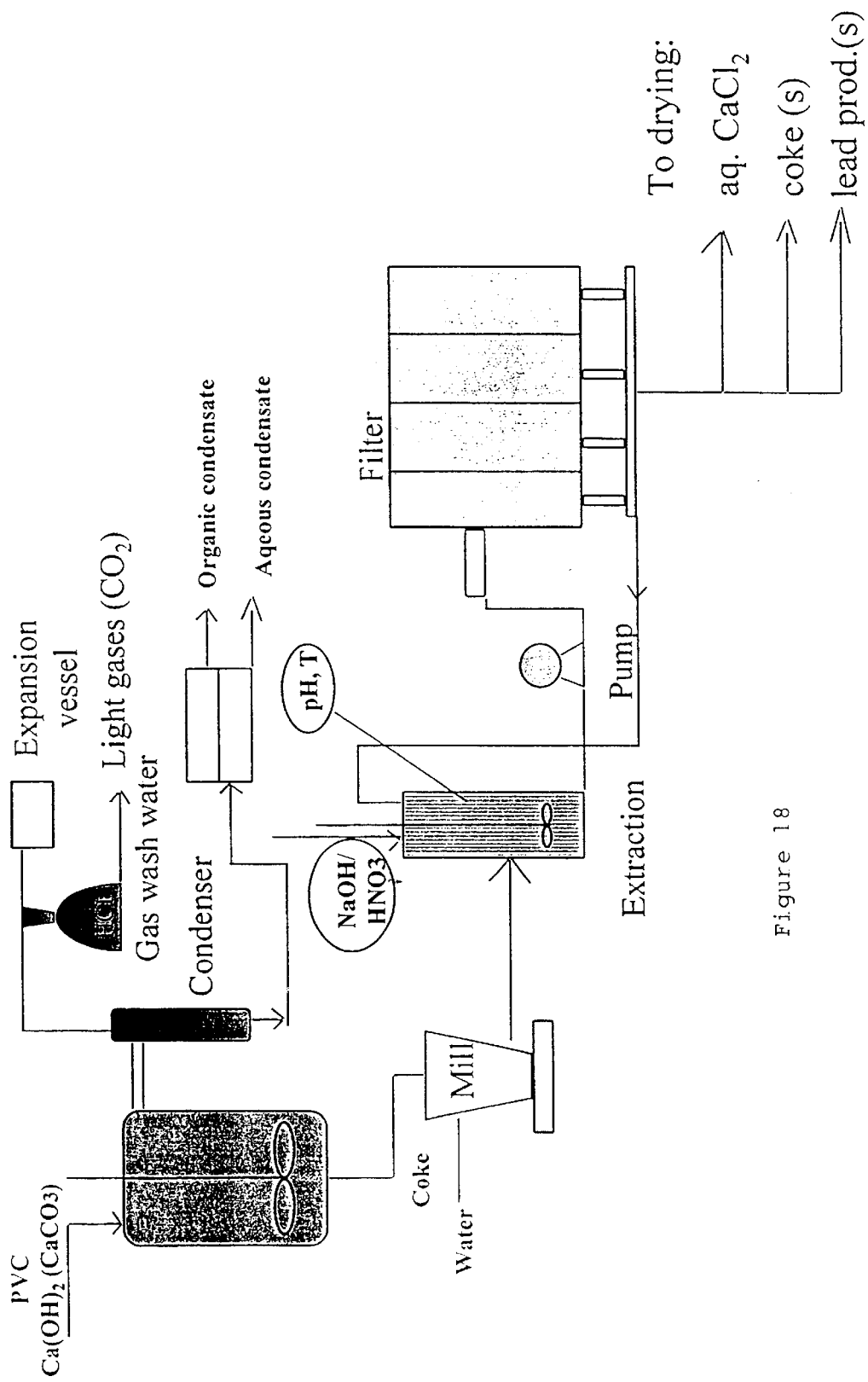
FIG. 18 is a flowsheet illustrating a preferred embodiment of the invention treating PVC cable/(building) waste.
Figure 19:
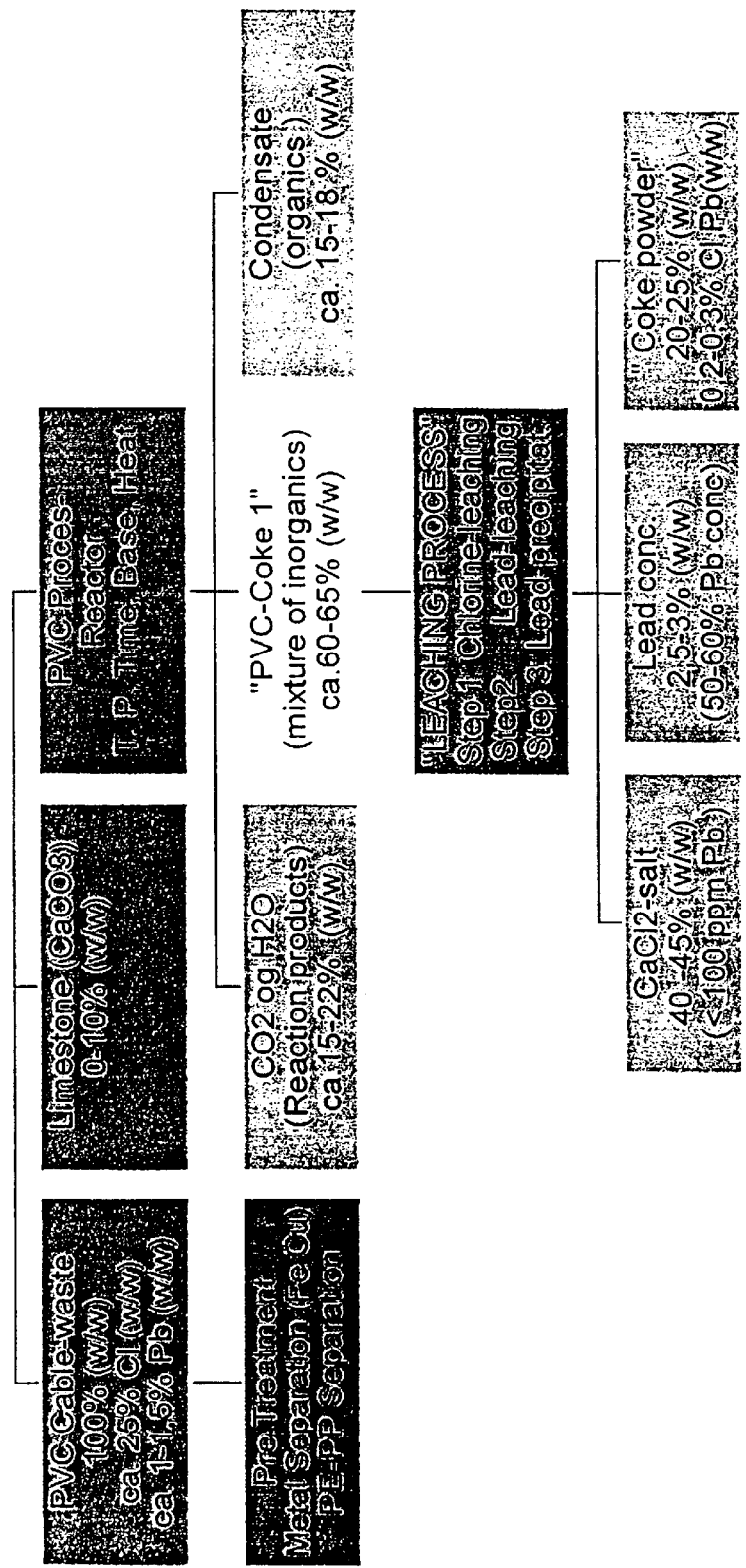
FIG. 19 is a material flowsheet for the embodiment illustrated in FIG. 18.

The concentrations of lead and chlorine in the coke product are illustrated in FIG. 9. The coke consists of approximately 0.4 weight % lead and 0.5 weight % chlorine.

EXAMPLES 1–4

The process can also be performed by downstream processing, where calcium chlorine and lead are removed from the coke in an extraction-filtration procedure (see FIG. 10–17). The extraction and filtration is repeated in several steps to ensure that as much chlorine and lead as possible is removed from the coke. Important parameters in the downstream filtration procedure are: extraction temperature, liquid-solid ratio, pH and comminution time. The values of these parameters in the examples 1–4 (experiments 501, 602, 606 and 608) are illustrated in Table 9.

TABLE 9

Parameter variation for extraction of lead and chlorine from coke in example 1–4

| Example no. (Experiment no.) | Comminution (min) | Temperature (° C.) | Liquid/solid ratio | pH |
|---|---|---|---|---|
| Ex. 1 (Exp. 501) | 10 | Cl 20 | 6:1 | 9.5 |
|  |  | Pb 50 | 6:1 | 1.0 |
| Ex. 2 (Exp. 602) | 10 | Cl 20 | 6:1 | 9.5 |
|  |  | Pb 20 | 6:1 | 1.0 |
| Ex. 3 (Exp. 606) | 10 | Cl 20 | 2:1 | 9.5 |
|  |  | Pb 20 | 2:1 | 1.0 |
| Ex. 4 (Exp. 608) | 10 | Cl 30 | 2:1 | 9.5 |
|  |  | Pb 20 | 4:1 | 1.0 |

The material balances and product distribution for each experiment are illustrated in FIGS. 10–16. Experiment 501 and 602 have been performed with an extraction-filtration procedure which employs de-ionised water in all steps. In experiment 606 and 608 recycling of aqueous filtrate between the steps have been employed. Therefore these experiments are described separately. A detailed illustration of the recycling process of experiment 606 and 608 is given in FIG. 17.

Example 1 (Experiment 501)

Example 2 (Experiment 602)

Separation of Lead and Chlorine from Coke without Recycling of Process Water (see FIGS. 10–13)

Step 1: Comminution and Formation of a Coke Suspension

The coke from the reactor is mixed with de-ionised water (400 ml) in a mill for 10 minutes.

Step 2: Separation of Chlorine from Coke

The liquid/solid ratio is set to 6:1 using de-ionised water. The extraction of chlorine begins, at 20° C., with a raise in pH to 9.5, using sodium hydroxide. The solution is stirred for 30 minutes. Around a pH of 9.5 the solubility of lead in the solution is at a minimum. Therefore the chlorine can be removed selectively from the coke by filtration. The filtrate is an aqueous suspension of calcium chlorine.

Step 3: Separation of Lead from Coke

The chlorine-free coke is mixed with water to a liquid-solid ratio of 6:1. The pH is lowered to 1.0 using nitric acid to dissolve as much lead as possible into the solution. The temperature is set to 50° C. (20° C. in experiment 602). Again, the mixture is stirred for 30 minutes. The mixture is filtered in all 2 times. The filtrate from the first lead extraction is the lead rich product which is sent to further processing.

Step 4: Purification of Lead

To the lead rich filtrate from step 3 sodium hydroxide is added to pH 9.5 (at 20° C.), in order to precipitate lead. The precipitated lead is filtered and the filter cake is the lead product.

Step 5: Purification of Chlorine Rich Salt

The chlorine rich solution is concentrated by drying, and the salt calcium chloride is formed.

Step 6: Purification of Coke

The coke is after filtration dried and represents the chlorine and lead free coke.

Example 3 (Experiment 606)

Example 4 (Experiment 608)

Separation of Lead and Chlorine from Coke with Recycling of Process Water (see FIGS. 14–17)

The chlorine and lead is separated sequentially from the coke, and aqueous filtrates are recycled (see FIGS. 14–17) within the process to reduce the consumption of water, nitric acid and sodium hydroxide by performing a counter current extraction process. The downstream separation procedure is performed as in a multi-stage extraction-filtration procedure (see Table 10).

TABLE 10

Steps in separation scheme

| Step | In | Filtrate | Coke |
|---|---|---|---|
| Chlorine filtration 1 | 1a Water from Cl filtr.2 | 1b $CaCl_2$ product | 1c Recycled |
| Chlorine filtration 2 | 2a Water from Cl filtr.3 | 2b to Cl. filtration 1 | 2c Recycled |
| Chlorine filtration 3 | 3a Pure water | 3b to Cl. filtration 2 | 3c Recycled |
| Lead filtration 1 | 4a Water from Pb filtr.2 | 4b Lead product | 4c Recycled |
| Lead filtration 2 | 5a Water from Pb filtr.3 | 5b to lead filtration 1 | 5c Recycled |
| Lead filtration 3 | 6a Pure water | 6b to lead filtration 2 | 6c Coke product |

The first time the separation of lead and chlorine takes place, pure water is employed in all chlorine and lead filtration steps. The filtrates are collected and filtrates from the second and third filtration are recycled to be re-used in future filtration steps. The steps described in the following (and in Table 10) are based on that the water from the previous separations is used in a counter current extraction mode. Optionally the pH is lowered with an acid to remove excess carbonate from the solution in the form of carbond-ioxide gas.

Step 1: Comminution and Formation of a Coke Suspension

The coke from the reactor is mixed in a mill with water for 10 minutes.

Step 2: Separation of Excess Carbonate

The pH is lowered with an acid to 3.0 to remove excess carbonate from the solution in the form of carbon dioxide gas from the suspension. This step may optionally be performed after any of the chlorine filtration stages.

Step 3: Separation of Chlorine from Coke

Chlorine Filtration 1

Recycled water (1a), see Table 1, is mixed with coke to a suitable liquid-solid ratio (2:1) at a suitable temperature (20° C. or 30° C.) . The pH is raised to 9.5 with sodium hydroxide. The mixture is stirred for 30 minutes. The suspension is filtered. The filtrate (1b) is removed from the system as calcium chloride product, and the coke (1c) obtained after filtration is recycled to the suspension tank.

Chlorine Filtration 2

In the second chlorine filtration, water (2a) is added to the suspension tank with the coke (1c) in a suitable liquid-solid ratio. pH is adjusted to 9.5, and the mixture is stirred for 30 minutes. The solution is filtered, and the filtrate (2b) is recycled to the chlorine filtration no. 1 (1a=2b). The coke (2c) is after filtration recycled to the suspension tank.

Chlorine Filtration 3

In the third chlorine filtration, pure water (3a) is added to the suspension tank together with the coke (2c) in a suitable liquid-solid ratio. pH is adjusted to 9.5, and the mixture is stirred for 30 minutes. The solution is filtered, and the filtrate (3b) is recycled to the chlorine filtration no. 2 (2a=3b). The chlorine lean coke (3c) is recycled to the suspension tank for lead separation.

Step 4: Separation of Lead from Coke

Lead Filtration 1

Water (4a) is mixed with the coke (3c) in the suspension tank in a suitable liquid-solid ratio (2:1 or 4:1). The temperature was set to 20° C. pH is adjusted to 1.0 with nitric acid to dissolve lead. The mixture is stirred for 30 minutes at a suitable temperature. The suspension is filtered. The filtrate is the lead product (4b) which is removed from the system. The coke (4c) is recycled to the suspension tank.

Lead Filtration 2

Water (5a) is mixed with the coke (4c) in the suspension tank in a suitable liquid-solid ratio. pH is adjusted to 1.0 with an acid, and the mixture is stirred for 30 minute at a suitable temperature. The suspension is filtered, and the filtrate (5b) is recycled to the lead filtration no. 1 (4a=5b). The coke (5c) is recycled to the suspension tank.

Lead Filtration 3

Pure water (6a) is added to the suspension tank, and is mixed with the coke (5c) in a suitable liquid-solid ratio. pH is adjusted to 1.0 with an acid, and the mixture is stirred for 30 minutes at a suitable temperature. The suspension is filtered, and the filtrate (6b) is recycled to the lead filtration no.2 (5a=6b). The coke product (6c) is now separated from lead and chlorine.

Step 5: Purification of Lead

See description of step 4 described in examples 1 and 2 above.

Step 6: Purification of Coke and Calcium Chloride Products

See description of step 5 and 6 described in examples 1 and 2 above.

The three main products are: 1) lead and chlorine free coke, 2) calcium chloride and 3) lead product.

Data for the described examples in terms of amount of coke in feed stream and product distribution (weight % of product of amount coke in feed) are given in Table 11.

TABLE 11

Amount coke in feed stream and product distribution

| Example no. (Experiment no.) | coke (g) | $CaCl_2$ product (weight %) | Ph-product (weight %) | coke (weight %) |
|---|---|---|---|---|
| Ex. 1 (Exp. 501) | 326.6 | 57.7 | 3.9 | 38.4 |
| Ex. 2 (Exp. 602) | 329.6 | 58.7 | 3.6 | 37.7 |
| Ex. 3 (Exp. 606) | 1966.0 | 55.0 | 3.0 | 42.0 |
| Ex. 4 (Exp. 608) | 5883.0 | 57.5 | 3.8 | 38.7 |

According to the invention a methodology has thus been developed for extraction of heavy metals and halogens, especially lead and chlorine from chlorine rich waste products such as:

Chlorine and lead rich coke from a PVC recycling process

Chlorine and lead rich residues or ashes/slag from incineration

The present invention has described a new technology for the separation of heavy metals and halogens, such as lead and chlorine from coke, ashes and/or slag. The new technology exploits differences in lead solubility with pH to separate lead and chlorine from coke. This work has illustrated that comminution, pH, temperature, liquid-solid ratio and comminution has a significant effect on the lead solubility in aqueous suspensions. The coke product has a lead content lower than 0.4 weight % and a chlorine content lower than 0.5 weight %.

What is claimed is:

1. A process for separation of a heavy metal and halogen from a waste material containing a mixture of the heavy metal and halogen, said waste material being selected from the group consisting of a waste product obtained from incineration of PVC material and a residue obtained from a decomposition of PVC material, said process comprising the steps of:

(i) selectively extracting the halogen from the waste material at a pH value between 7 and 11 to obtain an extracted waste material containing the heavy metal and a liquid containing the halogen;

(ii) selectively extracting the heavy metal from the extracted waste material at a pH value between 0 and 4 to obtain a cleaned waste material; and (iii) optionally precipitating metal extracted in step (ii).

2. The process according to claim 1, wherein the selective extraction of the halogen from the waste material in step (i) comprises a plurality of halogen extraction stages.

3. The process according to claim 2, wherein a sufficient number of said extraction stages are conducted for the process to effect an extraction of more than 98% of an initial halogen content of the waste material.

4. The process according to claim 1, wherein the selective extraction of the heavy metal from the waste material in step (ii) comprises a plurality of heavy metal extraction stages.

5. The process according to claim 4, wherein a sufficient number of the heavy metal extraction stages are conducted for the process to effect an extraction of more than 90% of an initial heavy metal content of the waste material.

6. The process according to claim 1, wherein the waste material is comminuted prior to the selective extraction of step (i).

7. The process according to claim 1, comprising removing carbon dioxide from the waste material prior to the selective extraction of step (i).

8. The process according to claim 1, wherein the selective extraction of step (i) comprises adjusting the pH value of an extraction medium with a base selected from the group consisting of an alkali metal hydroxide, an alkaline earth metal hydroxide and a mixture thereof.

9. The process according to claim 8, wherein the base is NaOH or CaOH.

10. The process according to claim 1, wherein the selective extraction of step (ii) comprises adjusting the pH value of an extraction medium with an acid selected from the group consisting of HCl, $HNO_3$ and acetic acid.

11. The process according to claim 10, wherein the acid is HCl or $HNO_3$.

12. The process according to claim 1, wherein the heavy metal is selected from the group consisting of lead, copper, zinc, cadmium, chromium, tin, manganese, nickel and mixtures thereof.

13. The process according to claim 1, wherein the halogen is selected from the group consisting of chlorine, fluorine, and bromine.

14. The process according to claim 1, wherein the selective extraction of step (i) is conducted at a pH value between 9 and 10.

15. The process according to claim 13, wherein the selective extraction of step (ii) is conducted at a pH value between 1 and 2.

16. The process according to claim 1, wherein the ratio of liquid to solid of the extracted waste material of step (i) is 1.5:1 to 50:1.

17. The process according to claim 16, wherein a ratio of liquid to solid or the extracted waste material of step (i) is 1.5:1 to 3:1.

18. The process according to claim 1, wherein the ratio of liquid to solid of the cleaned waste material of step (ii) is 0.5:1 to 50:1.

19. The process according to claim 18, wherein a ratio of liquid to solid of the cleaned waste material is 3:1 to 5:1.

20. The process according to claim 1, wherein the selective extraction of step (i) is performed at a temperature of 0° to 200° C.

21. The process according to claim 1, wherein the selective extraction of step (ii) is performed at a temperature of 20° C. to 100° C.

22. A process according to claim 1, wherein the extracted metal of metals from step ii) are precipitated at a pH valve about 9.5.

23. The process according to claim 1, wherein the halogen is selectively extracted to obtain an essentially halogen free waste material containing heavy metal, and a liquid containing halogen.

24. The process according to claim 1, wherein the heavy metal is selectively extracted to obtain a cleaned waste material essentially free from heavy metal and halogen.

* * * * *